UNITED STATES PATENT OFFICE.

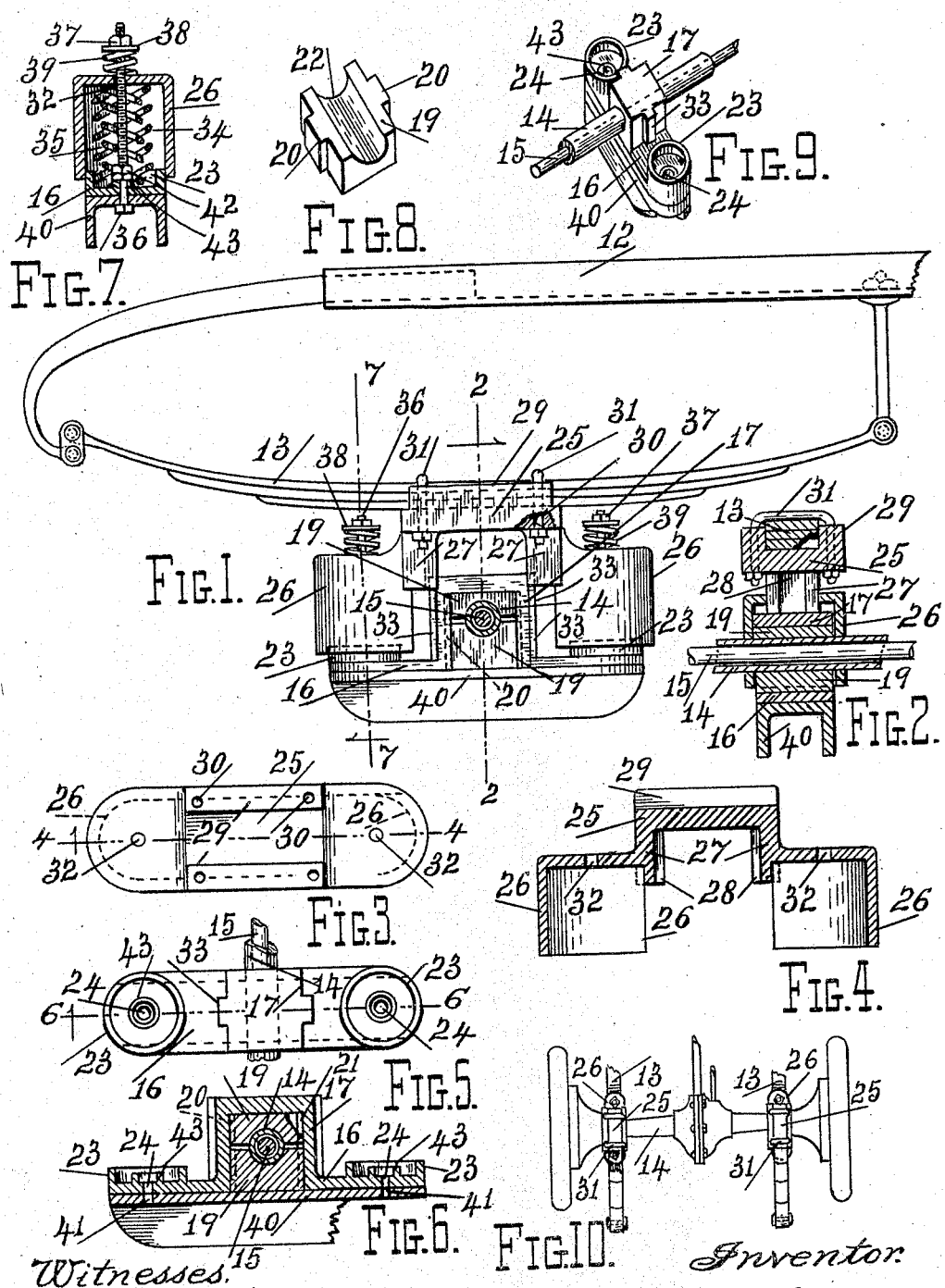

JAMES B. NEWTON, OF SPRINGFIELD, ILLINOIS.

SHOCK-ABSORBER FOR AUTOMOBILES OR OTHER VEHICLES.

1,237,372. Specification of Letters Patent. Patented Aug. 21, 1917.

Application filed October 14, 1916. Serial No. 125,580.

*To all whom it may concern:*

Be it known that I, JAMES B. NEWTON, a citizen of the United States, residing at Springfield, in the county of Sangamon and State of Illinois, have invented a new and useful Shock-Absorber for Automobiles or other Vehicles, of which the following is a specification.

This invention relates to improvements in shock absorbers primarily designed for use on automobiles or vehicles of the type which employ tubular axle-casings which inclose rotative live shafts or axles connected with the propelling wheels, and the purpose is to produce a shock absorber so constructed that it may be readily attached to automobiles or vehicles of different makes already in use and so constructed and arranged that the springs with which the shock absorber is equipped will tend to neutralize the shocks due to abrupt actions of the springs of the automobile or vehicle.

The invention consists in the novel features of construction and combinations of parts shown in the annexed drawing and hereinafter described and claimed.

Figure 1 is a side elevation of the shock absorber applied to a rear semi-elliptical spring and the tubular axle-casing which houses the live shaft of an automobile.

Fig. 2 is a vertical section on the line 2. 2. of Fig. 1.

Fig. 3 is a top plan of the housing.

Fig. 4 is a vertical section on the line 4. 4. of Fig. 3.

Fig. 5 is a top plan of the saddle in place on the tubular casing of an automobile.

Fig. 6 is a vertical section on the line 6. 6. of Fig. 5.

Fig. 7 is a vertical section through the saddle and the housing on the line 7. 7. of Fig. 1.

Fig. 8 is an enlarged isometric view of one of the blocks which hold the saddle on the tubular axle-casing.

Fig. 9 illustrates a modified construction in which the saddle is integral with the tubular axle-casing of an automobile, and Fig. 10 is a reduced diagrammatic top plan of a pair of shock absorbers in position on the tubular axle-casing of an automobile.

The same reference numbers designate the same parts in the different views.

In Fig. 1 of the drawing I have shown only one shock-absorber applied to one tubular axle-casing and one spring of a vehicle, as that is sufficient to illustrate the invention, but it is to be understood that in practice two shock-absorbers will be applied to each axle-casing. The saddle comprises a horizontal lower basal member 40 having rounded ends, a complemental upper basal member 16 having rounded ends, and a central vertical member 17 integral with the member 16.

The member 40 has downwardly extending parallel flanges along its entire length, which strengthen the member so that the weight carried by the springs 34 and 35 near the ends of the saddle will not break the saddle.

On top of and near the ends of the member 16 are circular cup-shape spring holders 23 and in the center of each spring holder is a boss 43 having a central hole 24. Holes 41 in the members 40 are in registry with the holes 24 in the members 16.

Blocks 19 have ribs 20 fitting in vertical channels 21 in the sides of the members 17 and also have concave parts 22 conformed closely to the periphery of the tubular axle-casing 14.

When the parts are assembled and the bolts tightened, the blocks 19 will bear firmly against the tubular axle-casing and will keep the saddle from turning on same.

The housing comprises in a single structure a cross head 25 having longitudinal flanges 29 provided with holes 30 adapted to accommodate U-bolts 31 which rigidly connect the housing with the semi-elliptical spring 13; spring barrels 26 adapted to telescope around the rounded ends of the saddle to inclose and protect the springs and prevent movement of the spring-barrels in the direction of the length of the saddle or in a direction transverse to the saddle; and vertical guides 27 having longitudinal channels 28, (Fig. 2) adapted to accommodate vertical guides 33 integral with the central member 17 of the saddle.

In the top walls of the spring barrels are holes 32 which are in line with the holes 24 in the member 16, and the holes 41 in the member 40.

The inside diameters of the spring barrels 26 are somewhat larger than the outside diameters of the spring holders 23, in order that the housing may be capable of free vertical movement outside of the saddle member 16, the vertical movement of the housing being guided and steadied by the guides 27 on the housing sliding on the guides 33 on the member 17 of the saddle; and by the inner walls of the spring barrels sliding on the ends and sides of the saddle.

Two coiled springs 34 and 35, one within the other, are seated in each spring holder 23 and extend upwardly into the corresponding spring barrel.

Bolts 36, which are threaded nearly their entire length, extend upwardly through the holes 41 and 24, through the springs 35 and through the holes 32 and are provided with nuts 37 at the upper ends of the bolts which engage on the washers 38; and nuts 42 which engage on the bosses 43 to securely connect the members 40 and 16.

Under each nut 37 is a washer 38 and a spring 39 which bears on top of the housing. By tightening or loosening the nuts 37 the springs 39 may be compressed more or less to cause such pressure of the housing on the upper ends of the springs 35 and 36 as will prevent undue looseness and rattling of the parts.

The construction which I have described is applicable to the tubular axle-casing of automobiles already in use. It is obvious however, that in new structures the members 40, 16, 17, 23 and 33 may be cast or made integral with the tubular axle-casing 14, (as shown in Fig. 9,) and in that case the blocks 19 will be unnecessary and will not be used.

In use the springs 34 and 35 constitute cushions between the tubular axle-casing and the vehicle spring 13 and serve to absorb the shocks caused by too sudden and abrupt movements of the vehicle.

I do not limit the claims to the precise details of construction shown and described, inasmuch as it is obvious that in minor details the construction may be varied without departure from my invention.

What I claim as new and desire to secure by Letters Patent is:

1. In a shock absorber, the combination of a two-member saddle having spring supports on one member; a vertically movable housing having spring barrels in line with the respective spring supports of the saddle; springs on said spring supports and occupying the respective barrels of the housing; bolts extending through said saddle, said springs and said housing; securing devices on said bolts securing the saddle members together; and adjusting devices on said bolts adapted to control adjustment of the housing relative to the springs housed therein, to prevent undue looseness and rattling of the parts.

2. In a shock absorber, the combination of a non-rotative tubular axle-casing, an immovable saddle transverse to the tubular axle-casing and comprising a channeled basal member having spring-supports, rounded ends and a vertical central member surrounding the tubular axle-casing and provided with vertical guides; springs supported on the spring-supports of the saddle; and a housing having members adapted to coöperate with the guides on the central member of the saddle, said housing being adapted to house and protect said springs and adapted to telescope around the rounded ends of the saddle to prevent displacement of the housing in a direction lengthwise of the saddle, or in a direction transverse to the saddle.

In witness whereof I have hereunto signed my name at Springfield, Illinois, this 16th day of September, 1916.

JAMES B. NEWTON.

Witnesses:
 W. S. TROXELL,
 J. ALLYNN TROXELL.

Copies of this patent may be obtained for five cents each, by addressing the "Commissioner of Patents, Washington, D. C."